(12) United States Patent
Yamada et al.

(10) Patent No.: US 12,225,169 B2
(45) Date of Patent: Feb. 11, 2025

(54) PRINTING SYSTEM, METHOD FOR PRODUCING PRINTED MATERIAL, AND NON-TRANSITORY COMPUTER-READABLE STORAGE MEDIUM STORING PROGRAM

(71) Applicant: SEIKO EPSON CORPORATION, Tokyo (JP)

(72) Inventors: Yusuke Yamada, Shiojiri (JP); Naoto Kuroda, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/544,554

(22) Filed: Dec. 19, 2023

(65) Prior Publication Data

US 2024/0205352 A1 Jun. 20, 2024

(30) Foreign Application Priority Data

Dec. 20, 2022 (JP) ................. 2022-203151

(51) Int. Cl.
*H04N 1/34* (2006.01)
*G06F 3/12* (2006.01)

(52) U.S. Cl.
CPC ........... *H04N 1/342* (2013.01); *G06F 3/1222* (2013.01); *G06F 3/1238* (2013.01); *G06F 3/128* (2013.01); *G06F 3/1292* (2013.01)

(58) Field of Classification Search
CPC ..... H04N 1/342; G06F 3/1222; G06F 3/1238; G06F 3/128; G06F 3/1292
See application file for complete search history.

(56) References Cited

U.S. PATENT DOCUMENTS

| 2011/0170131 | A1* | 7/2011 | Kondo ................ H04N 1/34 358/1.14 |
| 2012/0075676 | A1* | 3/2012 | Komoto .............. G06T 11/206 358/1.18 |
| 2016/0054957 | A1* | 2/2016 | Sako .................. G06F 3/1263 358/1.15 |
| 2016/0054958 | A1 | 2/2016 | Togashi et al. |
| 2020/0177746 | A1* | 6/2020 | Katsumata ......... H04N 1/00403 |

FOREIGN PATENT DOCUMENTS

JP 2016045683 A 4/2016

* cited by examiner

*Primary Examiner* — Iriana Cruz
(74) *Attorney, Agent, or Firm* — CHIP LAW GROUP

(57) ABSTRACT

A printing system includes a first terminal apparatus, a printing apparatus, and a first server. The first terminal apparatus acquires a mail address of the printing apparatus by near field communication with the printing apparatus or from a code displayed on the printing apparatus and transmits the acquired mail address to the first server. The first server transmits electronic data corresponding to the first terminal apparatus to the printing apparatus through a third communication path based on the received mail address.

11 Claims, 13 Drawing Sheets

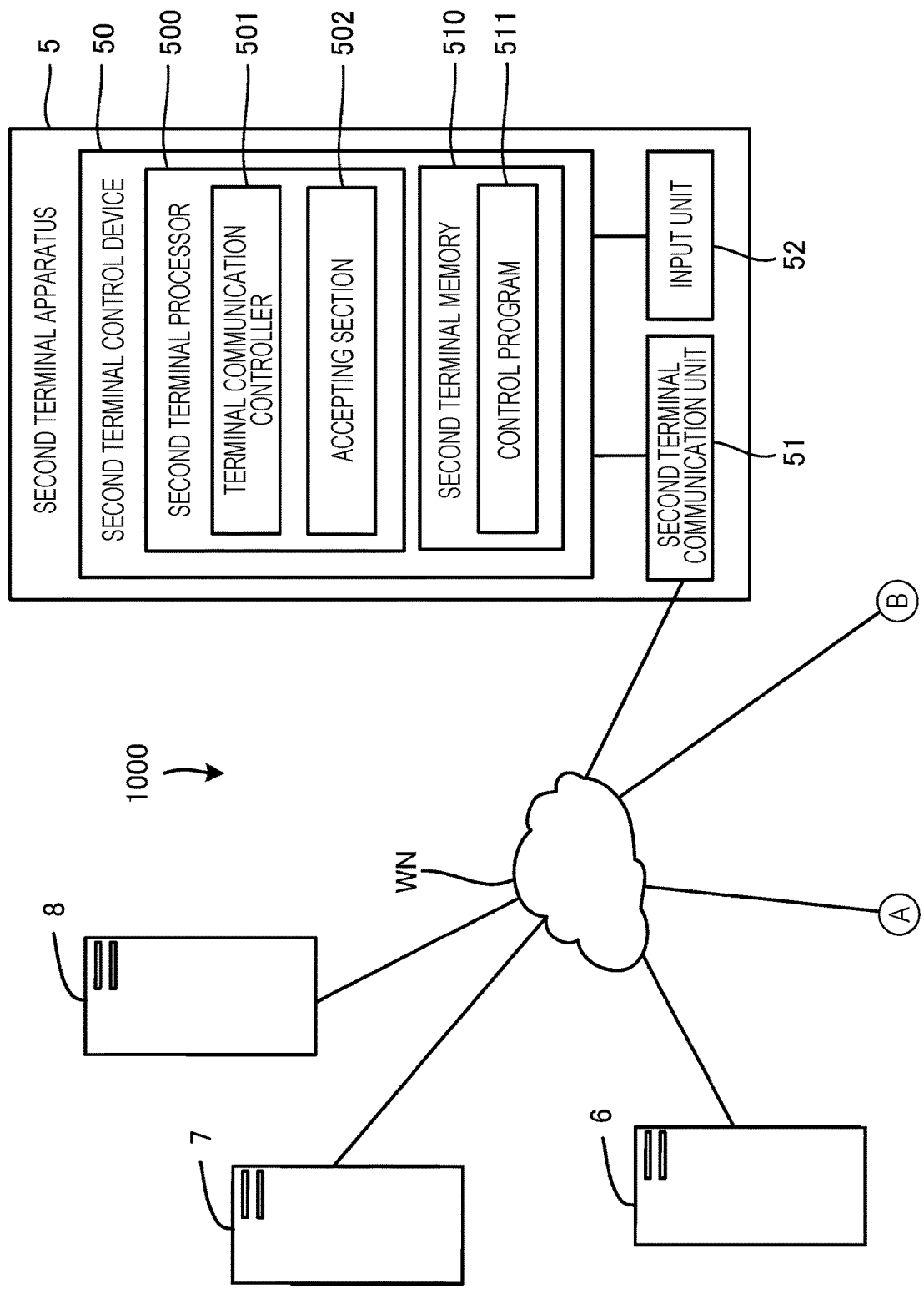

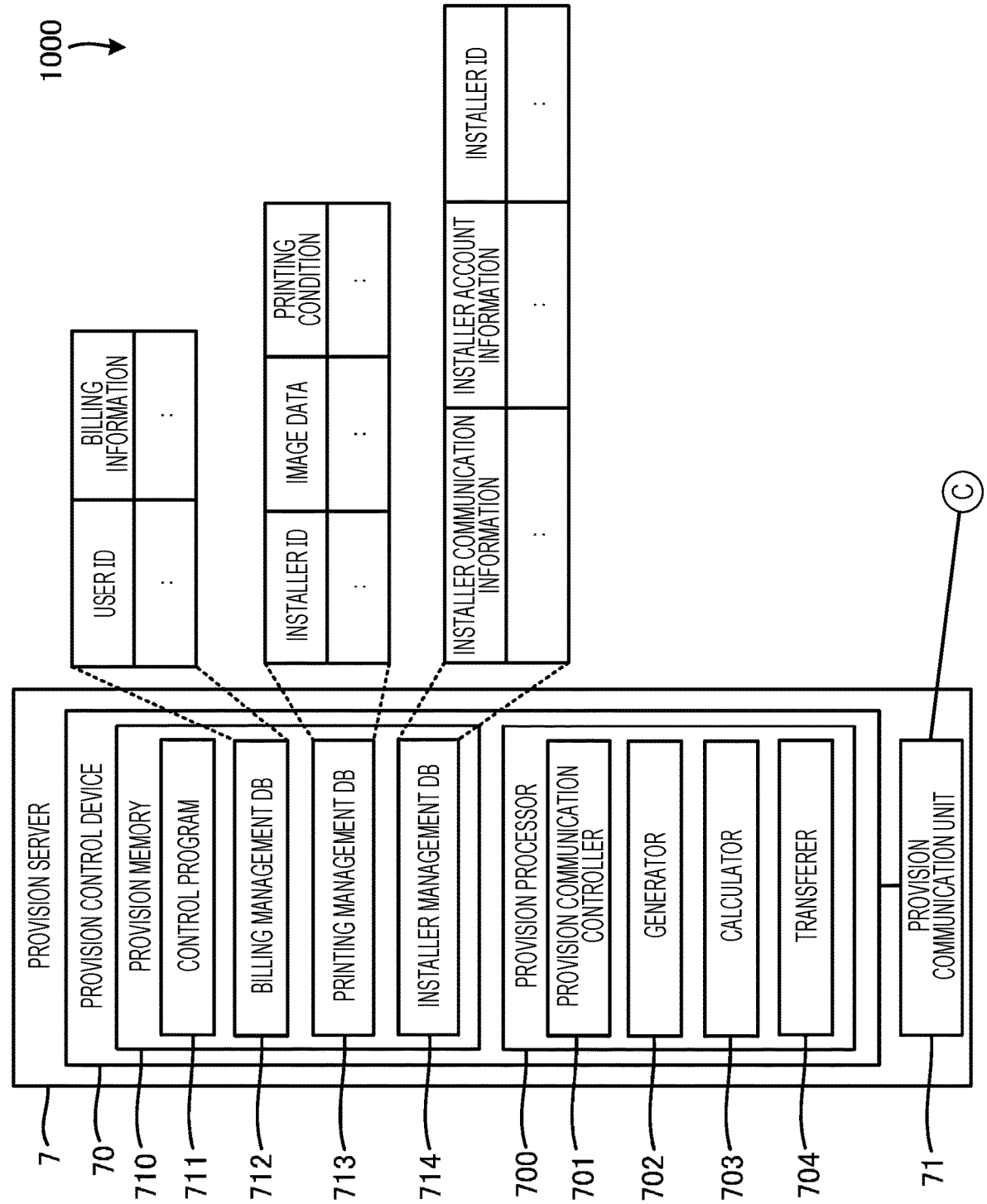

PRINTING SYSTEM, METHOD FOR PRODUCING PRINTED MATERIAL, AND NON-TRANSITORY COMPUTER-READABLE STORAGE MEDIUM STORING PROGRAM

The present application is based on, and claims priority from JP Application Serial Number 2022-203151, filed Dec. 20, 2022, the disclosure of which is hereby incorporated by reference herein in its entirety.

BACKGROUND

1. Technical Field

The present disclosure relates to a printing system, a method for producing a printed material, and a non-transitory computer-readable storage medium storing a program.

2. Related Art

A printing system is known, in which a server transmits electronic data received from a terminal apparatus to a printing apparatus and the printing apparatus performs printing based on the electronic data received from the server (see, for example, JP-A-2016-045683). In a printing system disclosed in JP-A-2016-045683, a printing server transmits a print job stored in the printing server to a printing apparatus in response to access to an URL by an execution instruction terminal, and the printing apparatus performs printing based on the print job received from the printing server.

Such printing systems as described in JP-A-2016-045683 include a system in which a printing apparatus performs printing at a location where third parties come and go. However, according to a system of this type, a third party can view and acquire a printed material earlier than a user, and thus there is a concern about security for a printed material. Therefore, for a system of this type, a mechanism has been proposed, in which a printing apparatus performs printing in a state in which a user is present near the printing apparatus. However, in this mechanism, a terminal apparatus used by the user and the printing apparatus need to participate in the same network, and it takes effort for the user to perform printing using the printing apparatus.

SUMMARY

According to an aspect of the present disclosure, a printing system includes a first terminal apparatus, a printing apparatus, and a first server. The first terminal apparatus acquires first specific information of the printing apparatus through a first communication path in which the first terminal apparatus performs near field communication with the printing apparatus, or from a code displayed on the printing apparatus, and transmits electronic data and the acquired first specific information to the first server through a second communication path. The first server transmits the received electronic data to the printing apparatus through a third communication path based on the received first specific information.

According to another aspect of the present disclosure, a method includes causing a first terminal apparatus to acquire first specific information of a printing apparatus from the printing apparatus in such a way that the first specific information does not pass through a first server; causing the first terminal apparatus to transmit the acquired first specific information to the first server in such a way that the first specific information does not pass through the printing apparatus; causing the first server to transmit, based on the received first specific information, electronic data corresponding to the first terminal apparatus to the printing apparatus in such a way that the electronic data does not pass through the first terminal apparatus; and causing the printing apparatus to produce a printed material by printing the received electronic data.

According to still another aspect of the present disclosure, a non-transitory computer-readable storage medium stores a program including causing a first terminal apparatus to operate to acquire first specific information of a printing apparatus from the printing apparatus in such a way that the first specific information does not pass through a first server; transmit the acquired first specific information to the first server in such a way that the first specific information does not pass through the printing apparatus; and cause the printing apparatus corresponding to the first specific information to print electronic data corresponding to the first terminal apparatus via the first server.

BRIEF DESCRIPTION OF THE DRAWINGS

FIGS. 2A to 2C are diagrams illustrating configurations of a printing apparatus, a first terminal apparatus, and a second terminal apparatus.

FIGS. 3A and 3B are diagrams illustrating configurations of a transfer server, a provision server, and a billing server.

DESCRIPTION OF EMBODIMENTS

1. First Embodiment 1.1. Configuration of Printing System

Figure 1:
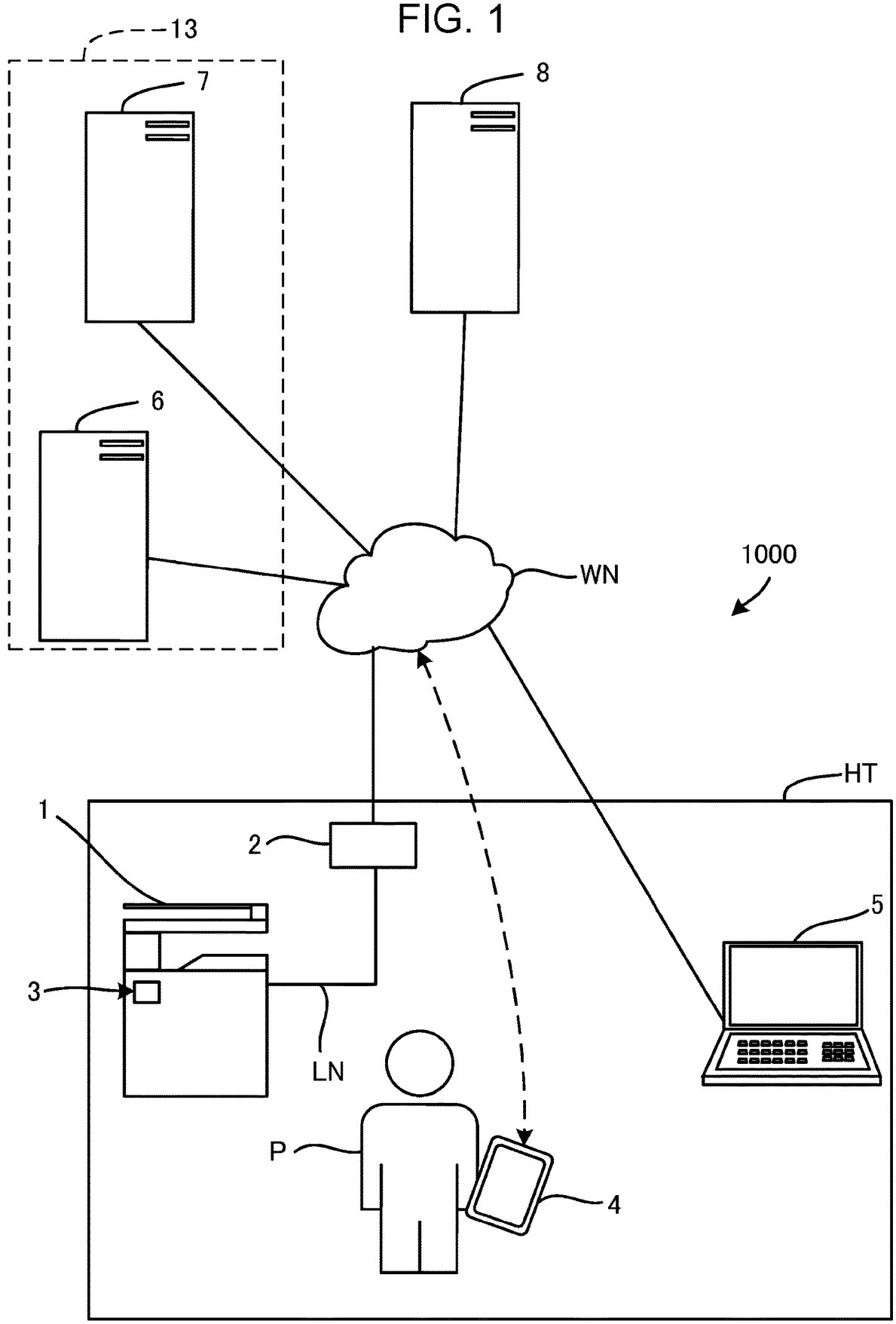
FIG. 1 is a diagram illustrating a configuration of a printing system according to a first embodiment.

FIG. 1 is a diagram illustrating a configuration of a printing system 1000.

As illustrated in FIG. 1, the printing system 1000 is a system that performs printing using a printing apparatus 1. The printing system 1000 according to a first embodiment performs printing using the printing apparatus 1 installed in a hotel HT. The printing apparatus 1 is installed at a location other than guest rooms in the hotel HT. For example, the printing apparatus 1 is installed at a front desk, a lobby, or the like. The printing apparatus 1 installed in the hotel HT is used by a user P of the hotel HT.

The user P is an example of a "user" in the present disclosure.

The printing system 1000 includes the printing apparatus 1.

The printing apparatus 1 is connected to a local network LN built in the hotel HT. The local network LN is connected to a wide area network WN via a communication apparatus 2. The printing apparatus 1 prints an image on a print medium. A printing method of the printing apparatus 1 is not limited. As the printing method of the printing apparatus 1, printing methods such as an ink jet method, an electronic transfer method, a dot impact method, a thermal sublimation method, and a thermal method can be used. In the present embodiment, a case where the printing method of the printing apparatus 1 is an ink jet method is exemplified.

A near field communication (NFC) tag 3 is attached at a predetermined position on a housing of the printing apparatus 1 installed in the hotel HT. In the NFC tag 3, a mail address assigned to the printing apparatus 1 or an IP address assigned to the printing apparatus 1 is recorded. In the NFC tag 3, an installer identification (ID) is recorded in addition to the mail address or the IP address. The installer ID is information uniquely identifying an entity that installed the printing apparatus 1. The entity that installed the printing apparatus 1 is hereinafter merely referred to as an installer. In the present embodiment, an example of the installer is an entity that operates the hotel HT.

Each of the mail address and the IP address is an example of "first specific information" in the present disclosure.

On the printing apparatus 1, a code in which the mail address or the IP address and the installer ID are recorded may be displayed, instead of the NFC tag 3. The code may be a one-dimensional code or a two-dimensional code. The code may be displayed in a form such as a tag with the code printed thereon, a label with the code printed thereon, a piece of paper with the code printed thereon. Alternatively, a display included in the printing apparatus 1 may display the code.

The printing system 1000 includes a first terminal apparatus 4.

The first terminal apparatus 4 is a personal computer (PC) used by the user P. In the present embodiment, a case where the first terminal apparatus 4 is a mobile PC such as a smartphone or a tablet terminal is exemplified. The first terminal apparatus 4 according to the present embodiment is connected to mobile data communication. The first terminal apparatus 4 according to the present embodiment is connectable to the local network LN and the wide area network WN. In the first terminal apparatus 4, an application program for receiving a service for using the printing apparatus 1 is installed. The application program is hereinafter referred to as a "printing application" and is denoted by a sign "411".

The printing system 1000 includes a second terminal apparatus 5. The second terminal apparatus 5 is a PC used by the user P. In the present embodiment, a case where the second terminal apparatus 5 is a laptop PC is exemplified. The second terminal apparatus 5 is connected to the wide area network WN. The second terminal apparatus 5 may be connected to the wide area network WN via the local network LN or may be connected to the wide area network WN via a network different from the local network LN.

The printing system 1000 includes a transfer server 6.

The transfer server 6 is a server apparatus that transfers electronic data stored in the second terminal apparatus 5 to the first terminal apparatus 4. The transfer server 6 is connected to the wide area network WN and communicates with the first terminal apparatus 4 and the second terminal apparatus 5.

The printing system 1000 includes a provision server 7.

The provision server 7 is a server apparatus that provides the service for using the printing apparatus 1. The provision server 7 is connected to the wide area network WN and communicates with the printing apparatus 1, the first terminal apparatus 4, and a billing server 8.

The transfer server 6 and the provision server 7 forms a first server 13. The first server 13 is a server collectively representing the transfer server 6 and the provision server 7.

The billing server 8 is an example of a "second server" in the present disclosure.

The printing system 1000 includes the billing server 8.

The billing server 8 is a server apparatus that issues, to the user P, a print ticket according to a billing amount charged for using the printing apparatus 1. The print ticket is electronic information. The print ticket is information of a right to perform printing on a single sheet using the printing apparatus 1. In the printing system 1000, the printing apparatus 1 can perform printing on a single sheet with a single print ticket. The billing server 8 is connected to the wide area network WN and communicates with the first terminal apparatus 4 and the provision server 7.

The print ticket is an example of "print right information" in the present disclosure.

To perform printing using the printing apparatus 1, the user P issues a print ticket according to billing in advance and consumes the issued print ticket to perform printing by using the printing apparatus 1 in the printing system 1000. In addition, to use the printing apparatus 1 to print, for example, an image in electronic data stored in the second terminal apparatus 5, the user P causes the second terminal apparatus 5 to transfer image data of the image to be printed to the first terminal apparatus 4 in the printing system 1000. In addition, the user P moves to the printing apparatus 1 and uses the first terminal apparatus 4 to cause the printing apparatus 1 to perform printing in the printing system 1000. The following description assumes image data as an example of a target to be printed, but it goes without saying that other electronic data such as a document file can be the target to be printed.

1-2. Configuration of Each Apparatus Included in Printing System

Next, a configuration of each apparatus included in the printing system 1000 is described.

Figure 2C:
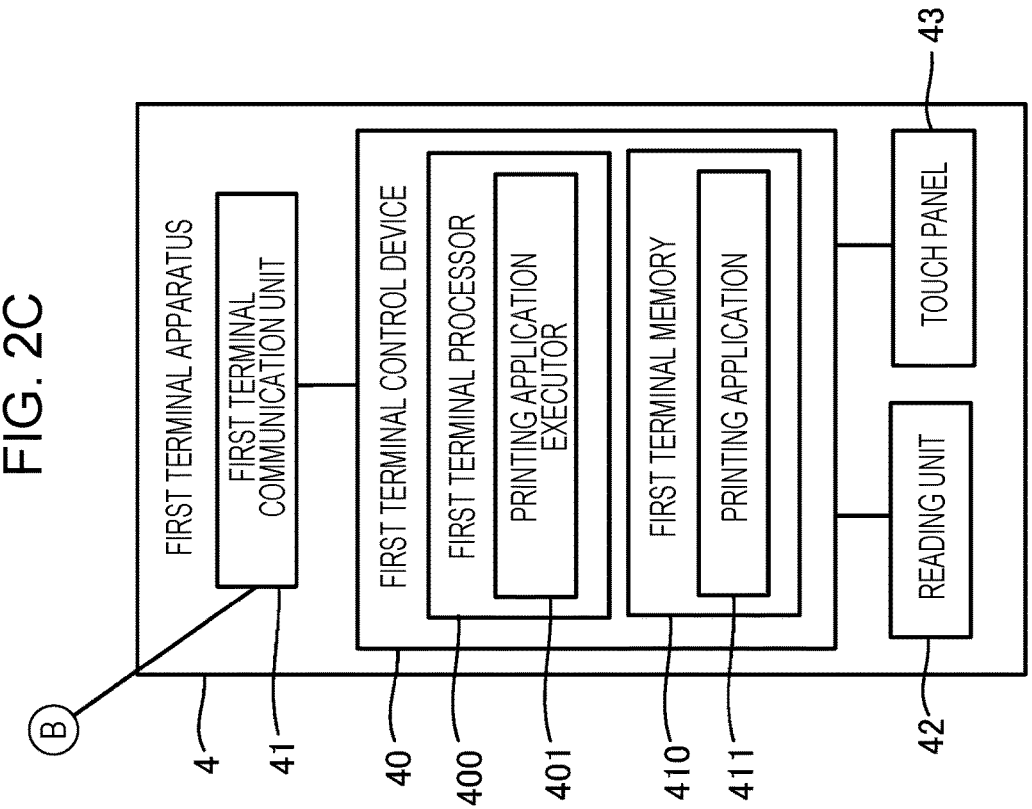
Figure 2B:
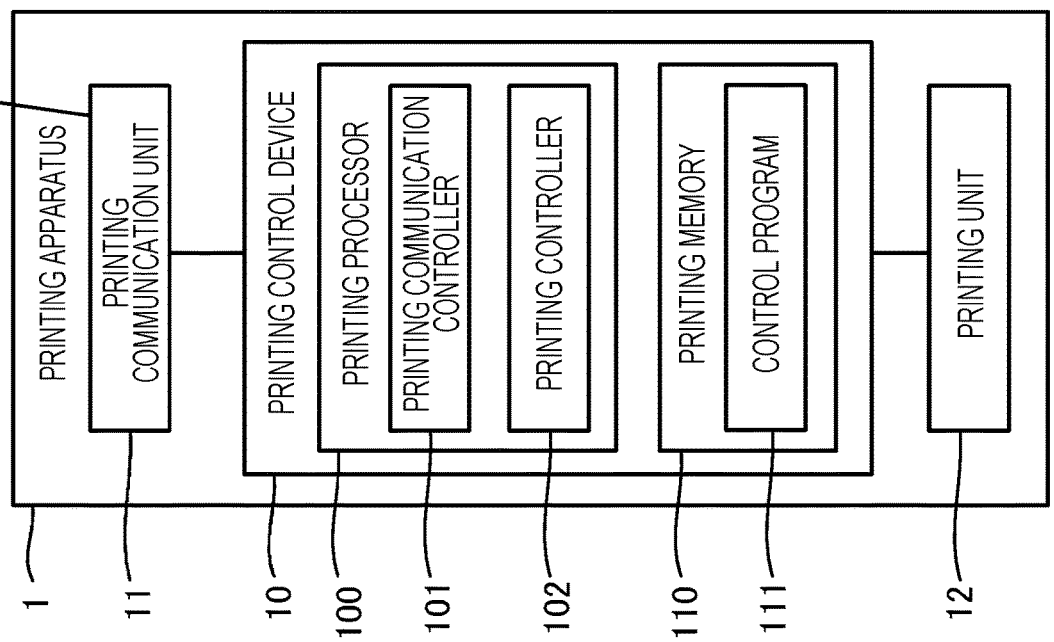

FIGS. 2A to 2C are diagrams illustrating configurations of the printing apparatus 1, the first terminal apparatus 4, and the second terminal apparatus 5.

1-2-1. Configuration of Printing Apparatus

First, the configuration of the printing apparatus 1 is described.

The printing apparatus 1 includes a printing control device 10, a printing communication unit 11, and a printing unit 12.

The printing control device 10 is a control device that controls each unit of the printing apparatus 1. The printing control device 10 includes a printing processor 100 that is a processor such as a CPU, a printing memory 110, and an interface circuit for connecting the printing apparatus 1 to the other apparatuses and sensors, and controls each unit of the printing apparatus 1.

The printing memory 110 is a memory storing a program and data. The printing memory 110 stores a control program 111 and data to be processed by the printing processor 100. The printing memory 110 includes a nonvolatile storage region. The printing memory 110 may include a volatile storage region and form a work area of the printing processor 100. The printing memory 110 includes, for example, a read-only memory (ROM) and a random-access memory (RAM).

The printing communication unit 11 includes communication hardware such as a communication circuit and communicates with the provision server 7 via a third communication path in accordance with control by the printing control device 10. The third communication path is a communication path in which the local network LN is used and through which data or the like is transmitted without passing through the first terminal apparatus 4. A communication standard of the printing communication unit 11 may be a wireless communication standard or a wired communication standard.

The printing unit 12 includes a printing mechanism that prints an image on a print medium. The printing unit 12 includes a print head that ejects ink, and a transport mechanism that transports the print medium. The printing unit 12 may include various sensors that detect the position and size of the print medium, a head scanning mechanism that causes the print head to perform scanning, and the like.

The printing processor 100 functions as a printing communication controller 101 and a printing controller 102 by reading and executing the control program 111.

The printing communication controller 101 communicates with the provision server 7 via the printing communication unit 11.

The printing controller 102 causes the printing unit 12 to perform printing.

1-2-2. Configuration of First Terminal Apparatus

Next, the configuration of the first terminal apparatus 4 is described.

The first terminal apparatus 4 includes a first terminal control device 40, a first terminal communication unit 41, a reading unit 42, and a touch panel 43.

The first terminal control device 40 is a control device that controls each unit of the first terminal apparatus 4. The first terminal control device 40 includes a first terminal processor 400 that is a processor such as a CPU, a first terminal memory 410, and an interface circuit for connecting the first terminal apparatus 4 to the other apparatuses and sensors, and controls each unit of the first terminal apparatus 4.

The first terminal memory 410 is a memory storing a program and data. The first terminal memory 410 stores the printing application 411 and data to be processed by the first terminal processor 400. The first terminal memory 410 includes a nonvolatile storage region. The first terminal memory 410 may include a volatile storage region and form a work area of the first terminal processor 400. The first terminal memory 410 includes, for example, a ROM and a RAM.

The first terminal communication unit 41 includes communication hardware such as a communication circuit and can communicate with the first server via a second communication path in accordance with control by the first terminal control device 40. The second communication path is a communication path in which a network other than the local network LN is used. In the present embodiment, an example of the second communication path is a communication path in which mobile data communication such as 4G or 5G is used. The second communication path is a communication path through which data or the like is transmitted without passing through the printing apparatus 1. In addition, in a state in which the first terminal apparatus 4 participates in the local network LN, the first terminal communication unit 41 can communicate with the printing apparatus 1 via the third communication path in accordance with control by the first terminal control device 40.

The reading unit 42 includes an NFC module and a camera. The reading unit 42 reads information recorded in a target to be read and outputs the read information to the first terminal control device 40. In the present embodiment, the reading unit 42 reads the information from the NFC tag 3 through a first communication path in which near field communication is performed. The NFC tag 3 is attached to the printing apparatus 1. Therefore, communication with the NFC tag 3 via the first communication path corresponds to communication with the printing apparatus 1 via the first communication path. In addition, the reading unit 42 may read the information from a barcode by using the camera to capture an image of a sticker of the barcode attached to the printing apparatus 1. In any of the cases, the reading unit 42 acquires the information from the printing apparatus 1 in such a way that the information does not pass through the first server 13.

The touch panel 43 includes a display panel such as a liquid crystal display panel and a touch sensor disposed overlapping the display panel or disposed integrally with the display panel. The display panel displays various images in accordance with control by the first terminal control device 40. The touch sensor detects a touch operation and outputs data or the like corresponding to the detected touch operation to the first terminal control device 40. The first terminal control device 40 executes processing corresponding to the touch operation based on the data or the like input from the touch sensor.

The first terminal processor 400 functions as a printing application executor 401 by reading and executing the printing application 411.

The printing application executor 401 communicates with the first server 13 via the first terminal communication unit 41.

The printing application executor 401 causes the reading unit 42 to read the information from the target to be read.

The printing application executor 401 causes the touch panel 43 to display various types of information.

The printing application executor 401 accepts various operations from the user P via the touch panel 43.

1-2-3. Configuration of Second Terminal Device

Next, the configuration of the second terminal apparatus 5 is described.

The second terminal apparatus 5 includes a second terminal control device 50, a second terminal communication unit 51, and an input unit 52.

The second terminal control device 50 is a control device that controls each unit of the second terminal apparatus 5. The second terminal control device 50 includes a second terminal processor 500 that is a processor such as a CPU, a second terminal memory 510, and an interface circuit for connecting the second terminal apparatus 5 to the other apparatuses and sensors, and controls each unit of the second terminal apparatus 5.

The second terminal memory 510 is a memory storing a program and data. The second terminal memory 510 stores a control program 511 and data to be processed by the second terminal processor 500. The second terminal memory 510 includes a nonvolatile storage region. The second terminal memory 510 may include a volatile storage region and form a work area of the second terminal processor 500. The second memory 510 includes, for example, a ROM and a RAM.

The second terminal communication unit 51 includes communication hardware such as a communication circuit and communicates with the transfer server 6 in accordance with control by the second terminal control device 50. A communication standard of the second terminal communication unit 51 may be a wireless communication standard or a wired communication standard.

The input unit 52 is an interface that connects input units such as an operation switch disposed in the second terminal apparatus 5, a panel having a touch input function, a mouse, and a keyboard to each other, detects operations on the input units, and outputs results of the detection to the second terminal control device 50. The second terminal control device 50 executes processing corresponding to the operations on the input units based on the detection results input from the input unit 52.

The second terminal processor 500 functions as a terminal communication controller 501 and an accepting section 502 by reading and executing the control program 511.

The terminal communication controller 501 communicates with the transfer server 6 via the second terminal communication unit 51.

The accepting section 502 accepts various operations from the user P via the input unit 52.

Next, a configuration of each server is described.

Figure 3A:
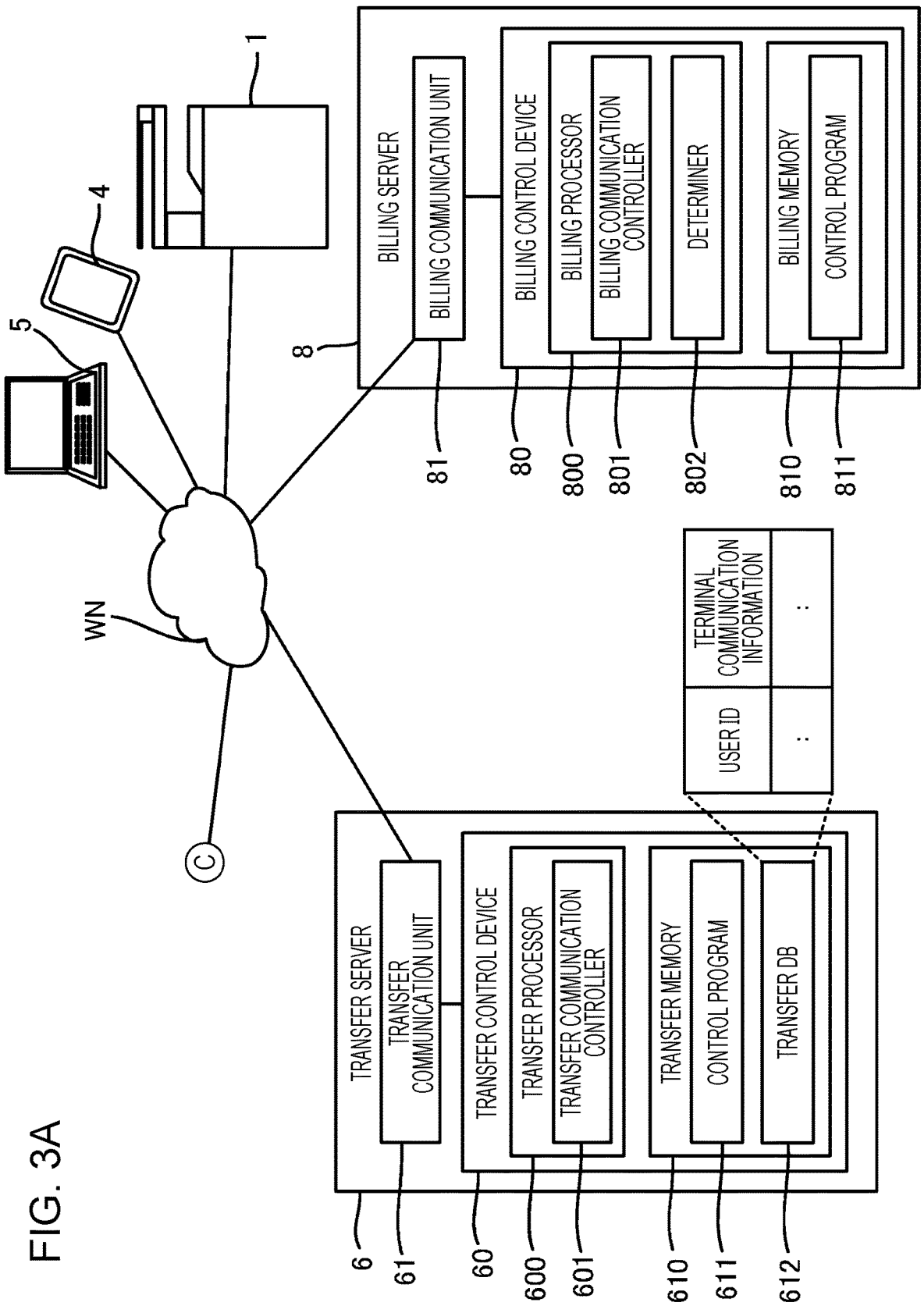

FIGS. 3A and 3B are diagrams illustrating configurations of the transfer server 6, the provision server 7, and the billing server 8.

1-2-4. Configuration of Transfer Server

First, the configuration of the transfer server 6 is described.

The transfer server 6 includes a transfer control device 60 and a transfer communication unit 61.

The transfer control device 60 is a control device that controls each unit of the transfer server 6. The transfer control device 60 includes a transfer processor 600 that is a processor such as a CPU, a transfer memory 610, and an interface circuit for connecting the transfer server 6 to the other apparatuses and sensors, and controls each unit of the transfer server 6.

The transfer memory 610 is a memory storing a program and data. The transfer memory 610 stores a control program 611, a transfer database (DB) 612, and data to be processed by the transfer processor 600. The transfer memory 610 includes a nonvolatile storage region. The transfer memory 610 may include a volatile storage region and form a work area of the transfer processor 600. The transfer memory 610 includes, for example, a ROM and a RAM.

The transfer DB 612 is a database for transfer of image data to the first terminal apparatus 4. A user ID and terminal communication information are recorded in a single record stored in the transfer DB 612.

The user ID is information identifying a user of the printing application 411.

The terminal communication information is information for communication with the first terminal apparatus 4. An example of the terminal communication information is address information.

The transfer communication unit 61 includes communication hardware such as a communication circuit and communicates with the first terminal apparatus 4 and the second terminal apparatus 5 in accordance with control by the transfer control device 60.

The transfer processor 600 functions as a transfer communication controller 601 by reading and executing the control program 611.

The transfer communication controller 601 communicates with the first terminal apparatus 4 and the second terminal apparatus 5 via the transfer communication unit 61.

1-2-5. Configuration of Provision Server

Next, the configuration of the provision server 7 is described.

The provision server 7 includes a provision control device 70 and a provision communication unit 71.

The provision control device 70 is a control device that controls each unit of the provision server 7. The provision control device 70 includes a provision processor 700 that is a processor such as a CPU, a provision memory 710, and an interface circuit for connecting the provision server 7 to the other apparatuses and sensors, and controls each unit of the provision server 7.

The provision memory 710 is a memory storing a program and data. The provision memory 710 stores a control program 711, a billing management DB 712, a printing management DB 713, an installer management DB 714, and data to be processed by the provision processor 700. The provision memory 710 includes a nonvolatile storage region. The provision memory 710 may include a volatile storage region and form a work area of the provision processor 700. The provision memory 710 includes, for example, a ROM and a RAM.

The billing management DB 712 is a database for management of billing information. A user ID and billing information are recorded in a single record stored in the billing management DB 712. The billing information is information indicating a billing amount charged for using the printing apparatus 1.

The printing management DB 713 is a database for management of information regarding printing. The installer ID and printing information are recorded in a single record stored in the printing management DB 713. The printing information has, recorded therein, image data representing an image to be printed and a printing condition.

The installer management DB 714 is a database for management of information regarding the installer. Installer communication information, installer account information, and the installer ID are recorded in a single record stored in the installer management DB 714.

The installer communication information is information for communication with a PC used by the installer and is, for example, an address.

The installer account information is information indicating an account used by the installer and is, for example, an account number.

The mail address recorded in the record of the installer management DB 714 is assigned to the printing apparatus 1 installed by the installer.

The provision communication unit 71 includes communication hardware such as a communication circuit and communicates with the printing apparatus 1, the first terminal apparatus 4, the second terminal apparatus 5, and the billing server 8 in accordance with control by the provision control device 70.

The provision processor 700 functions as a provision communication controller 701, a generator 702, a calculator 703, and a transferer 704 by reading and executing the control program 711.

The provision communication controller 701 communicates with the printing apparatus 1, the first terminal apparatus 4, the second terminal apparatus 5, and the billing server 8 via the provision communication unit 71.

The generator 702 generates print data. The print data includes image data and a control command conforming to a command system of the printing apparatus 1.

The calculator 703 calculates a printing cost of printing by the printing apparatus 1. The printing cost includes the cost of a print medium consumed, the cost of ink consumed, and the like.

The transferer 704 transfers the printing cost calculated by the calculator 703 to the account used by the installer.

1-2-6. Configuration of Billing Server

Next, the configuration of the billing server 8 is described.

The billing server 8 includes a billing control device 80 and a billing communication unit 81.

The billing control device 80 is a control device that controls each unit of the billing server 8. The billing control device 80 includes a billing processor 800 that is a processor such as a CPU, a billing memory 810, and an interface circuit for connecting the billing server 8 to the other apparatuses and sensors, and controls each unit of the billing server 8.

The billing memory 810 is a memory storing a program and data. The billing memory 810 stores a control program 811 and data to be processed by the billing processor 800. The billing memory 810 includes a nonvolatile storage region. The billing memory 810 may include a volatile storage region and form a work area of the billing processor 800. The billing memory 810 includes, for example, a ROM and a RAM.

The billing communication unit 81 includes communication hardware such as a communication circuit and communicates with the first terminal apparatus 4 and the provision server 7 in accordance with control by the billing control device 80.

The billing processor 800 functions as a billing communication controller 801 and a determiner 802 by reading and executing the control program 811.

The billing communication controller 801 communicates with the first terminal apparatus 4 and the provision server 7 via the billing communication unit 81.

The determiner 802 determines the number of print tickets to be issued.

1-3. Operation of Printing System

Next, an operation of the printing system 1000 is described.

1-3-1. Operation for Issuance of Print Ticket

As described above, in the printing system 1000, the user P consumes an issued print ticket to perform printing using the printing apparatus 1.

First, an operation of the printing system 1000 for issuance of a print ticket is described below.

Figure 4:
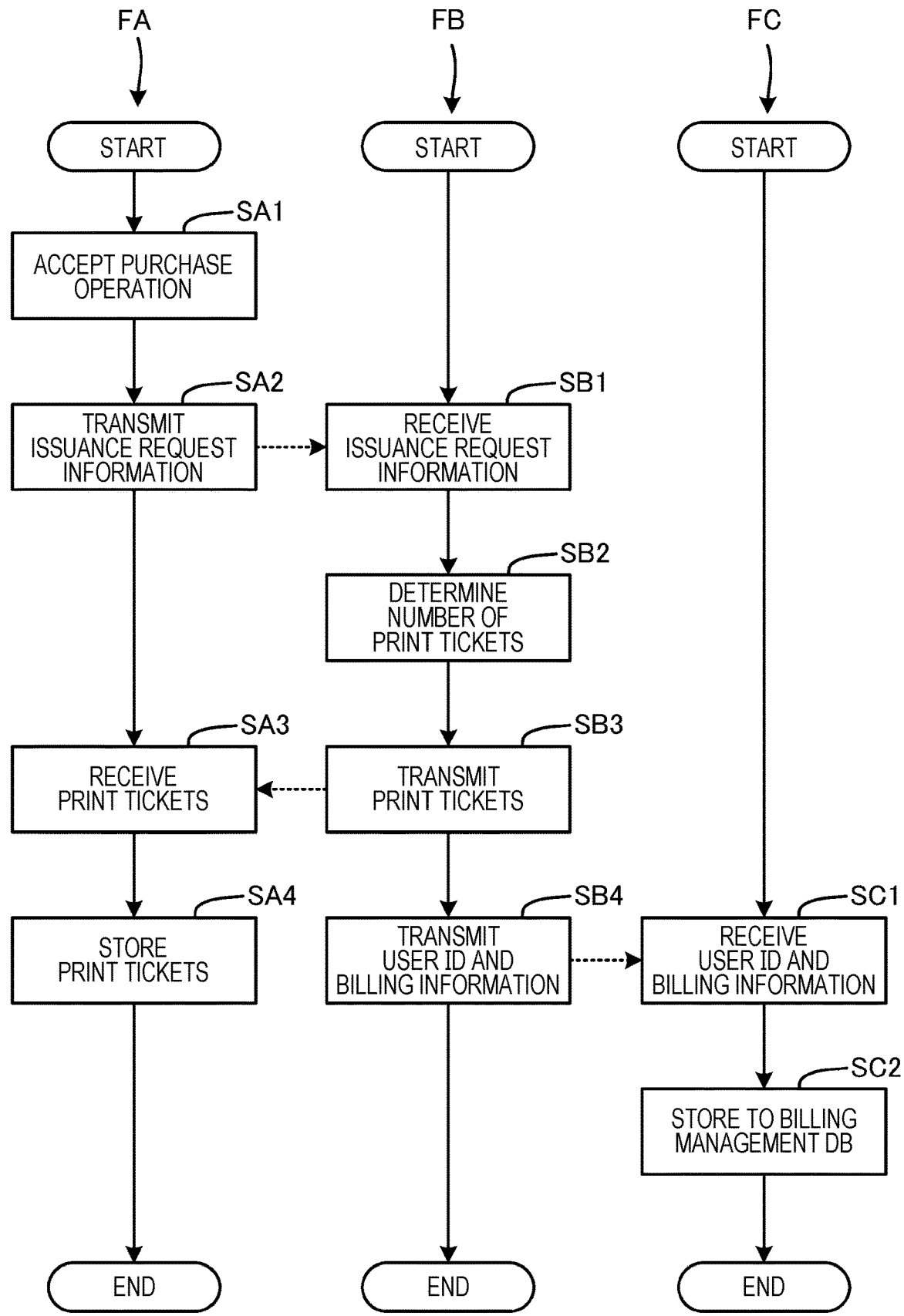
FIG. 4 is a flowchart illustrating an operation of the printing system.

FIG. 4 is a flowchart illustrating the operation of the printing system 1000.

In FIG. 4, a flowchart FA represents an operation of the first terminal apparatus 4, a flowchart FB represents an operation of the billing server 8, and a flowchart FC represents an operation of the provision server 7.

The printing application executor 401 of the first terminal apparatus 4 accepts a purchase operation for purchasing a print ticket (step SA1).

Next, the printing application executor 401 transmits issuance request information to the billing server 8 (step SA2). The issuance request information is information requesting to issue a print ticket. The issuance request information includes billing information indicating a billing amount charged for using the printing apparatus 1 by the user P. The issuance request information further includes the user ID. The user ID is input to the first terminal apparatus 4 at a predetermined timing and stored in a storage region where the printing application executor 401 can read the user ID.

As indicated by the flowchart FB, the billing communication controller 801 receives the issuance request information (step SB1).

Thereafter, the determiner 802 determines the number of print tickets to be issued to the user P, based on the billing amount indicated in the billing information included in the issuance request information received in step SB1 (step SB2). For example, it is assumed that 20 print tickets are defined to be issued for a billing amount "$\alpha$". In this case, when the billing amount indicated in the billing information included in the issuance request information is "$2\alpha$", the determiner 802 determines the number of print tickets to be issued as 40. Thereafter, the billing communication controller 801 transmits the number of print tickets determined in step SB2 to the first terminal apparatus 4 in response to the issuance request information (step SB3).

As indicated by the flowchart FA, the printing application executor 401 receives the number of print tickets determined in step SB2 (step SA3).

Thereafter, the printing application executor 401 stores the received print tickets to the first terminal memory 410 (step SA4).

As indicated by the flowchart FB, the billing communication controller 801 transmits, to the provision server 7, the user ID and the billing information included in the issuance request information received in step SB1 (step SB4).

As indicated by the flowchart FC, the provision communication controller 701 receives the user ID and the billing information from the billing server 8 (step SC1).

Thereafter, the provision communication controller 701 stores, to the billing management DB 712, a record having the user ID and the billing information received in step SC1 (step SC2). Therefore, the billing information is managed by the provision server 7.

1-3-2. Operation for Transfer of Image Data

As described above, when an image generated by the second terminal apparatus 5, an image downloaded by the second terminal apparatus 5, or the like is to be printed by the printing apparatus 1, image data stored in the second terminal apparatus 5 is transferred to the first terminal apparatus 4 in the printing system 1000.

Next, an operation of the printing system 1000 for transfer of image data is described.

Figure 5:
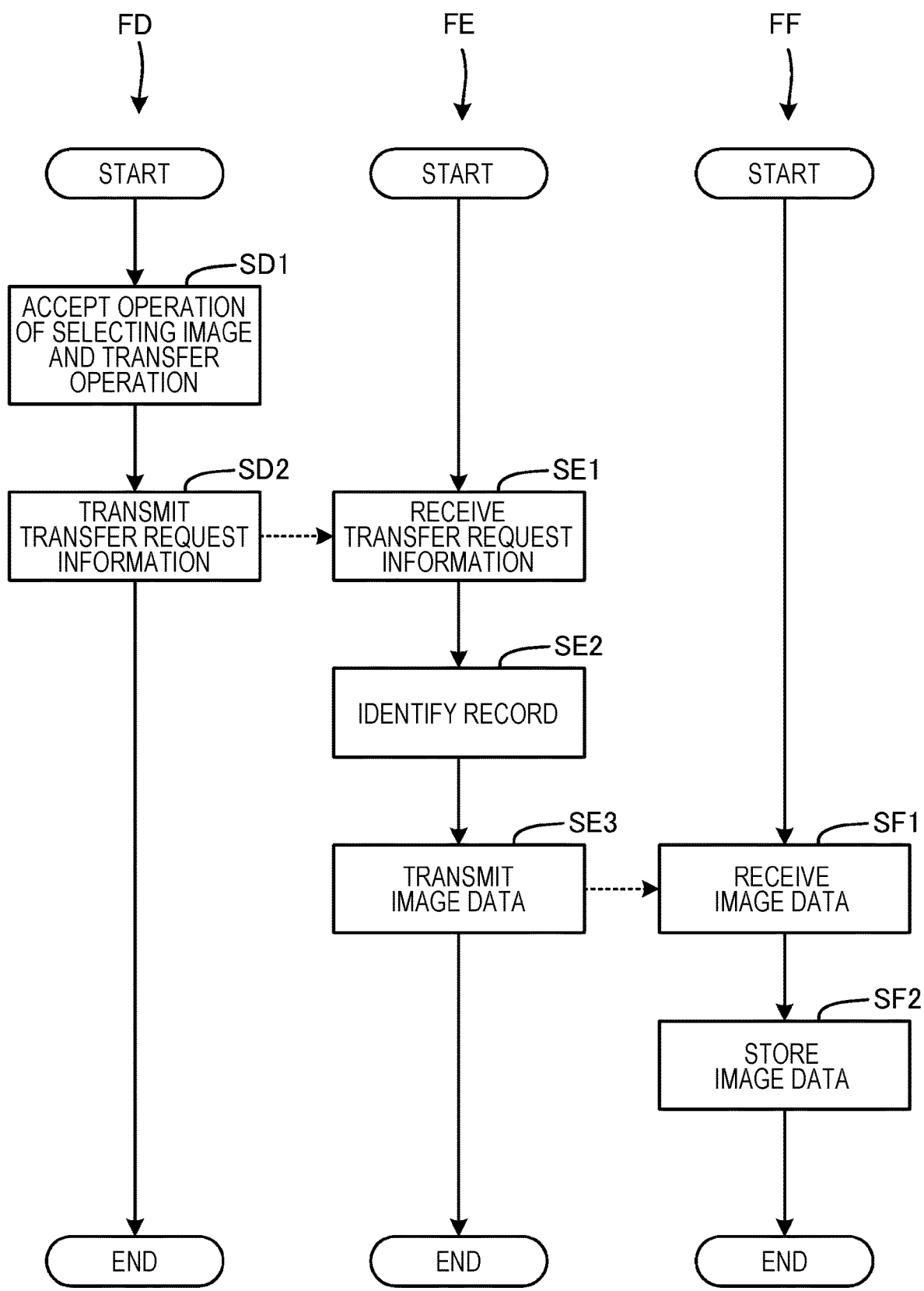
FIG. 5 is a flowchart illustrating an operation of the printing system.

FIG. 5 is a flowchart illustrating the operation of the printing system 1000.

In FIG. 5, a flowchart FD represents an operation of the second terminal apparatus 5, a flowchart FE represents an operation of the transfer server 6, and a flowchart FF represents an operation of the first terminal apparatus 4.

As indicated by the flowchart FD, the accepting section 502 accepts an operation of selecting an image to be transferred and an operation of transferring image data of the selected image (step SD1).

Thereafter, the terminal communication controller 501 transmits transfer request information to the transfer server 6 (step SD2). The transfer request information is information requesting to transfer the image data of the image selected in steep SD1 and includes the image data and the user ID. The user ID is input to the second terminal apparatus 5 at a predetermined timing and stored in a storage region where the terminal communication controller 501 can read the user ID.

As indicated by the flowchart FE, the transfer communication controller 601 receives the transfer request information (step SE1).

Thereafter, the transfer communication controller 601 identifies, from the transfer DB 612, a record having the user ID included in the transfer request information (step SE2).

Thereafter, the transfer communication controller 601 transmits, to the first terminal apparatus 4, the image data included in the transfer request information received in step SE1, based on terminal communication information included in the record identified in step SE2 (step SE3).

As indicated by the flowchart FF, the printing application executor 401 receives the image data from the transfer server 6 (step SF1).

Thereafter, the printing application executor 401 stores, to the first terminal memory 410, the image data received in step SF1 (step SF2).

1-3-3. Operation for Printing

As described above, the user P moves to the printing apparatus 1 and uses the first terminal apparatus 4 to cause the printing apparatus 1 to perform printing.

Next, an operation of the printing system 1000 for a case where the first terminal apparatus 4 is used to cause the printing apparatus 1 to perform printing is described.

Figure 6:
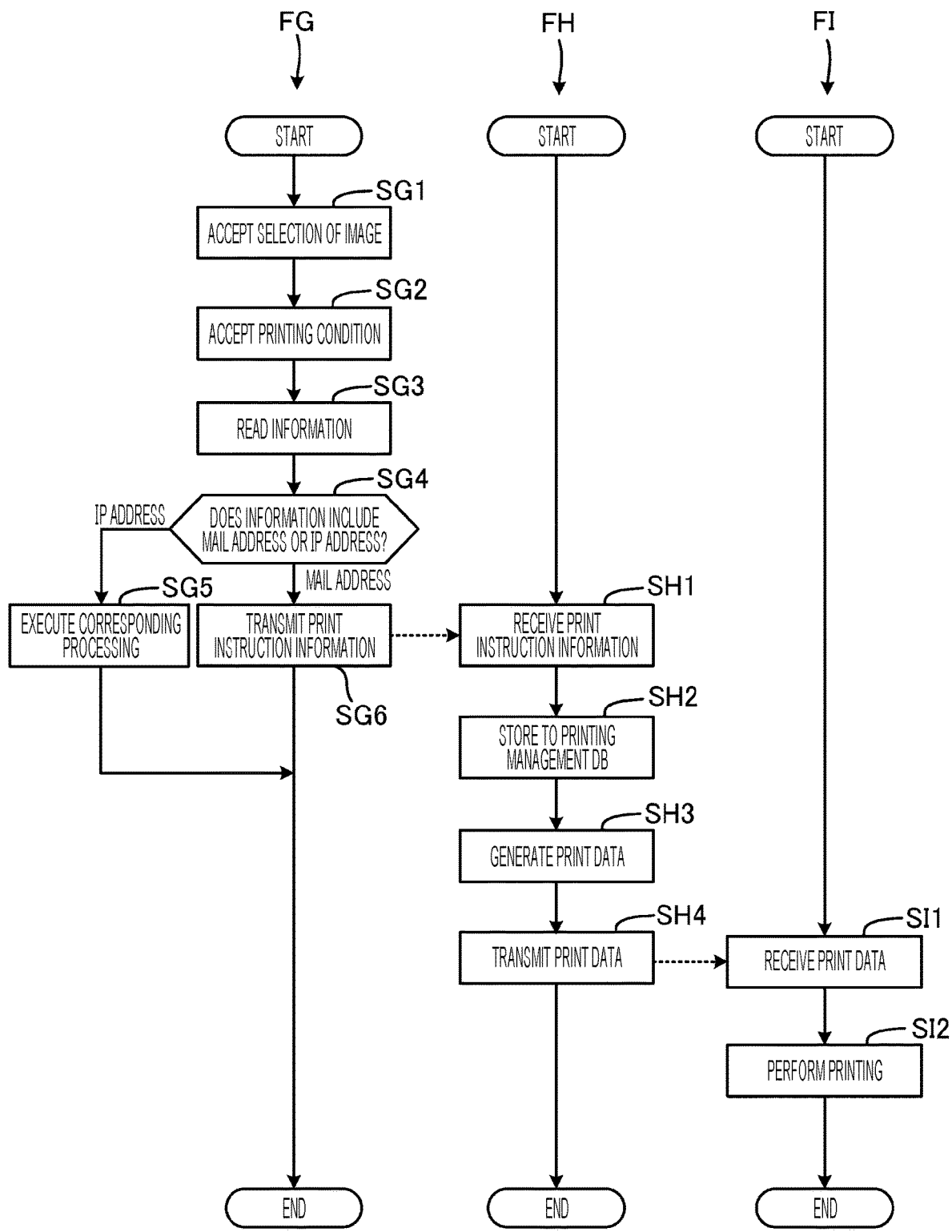
FIG. 6 is a flowchart illustrating an operation of the printing system.

FIG. 6 is a flowchart illustrating the operation of the printing system 1000.

In FIG. 6, a flowchart FG represents an operation of the first terminal apparatus 4, a flowchart FH represents an operation of the provision server 7, and a flowchart FI represents an operation of the printing apparatus 1.

As indicated by the flowchart FG, the printing application executor 401 accepts selection of an image to be printed by the printing apparatus 1 (step SG1). The image selected in step SG1 may be an image transferred from the second terminal apparatus 5 or may be an image held in the first terminal apparatus 4 in advance.

Thereafter, the printing application executor 401 accepts a printing condition for printing of the image selected in step SG1 (step SG2). The printing condition accepted in step SG2 includes the number of prints, the size of a print medium, a printing form such as color printing or monochrome printing, and the like. The printing application executor 401 accepts the number of prints in the printing condition in such a way that the number of prints does not exceed the number of print tickets stored in the first terminal memory 410. In other words, the printing application executor 401 does not accept a printing condition indicating the number of prints that exceeds the number of print tickets stored in the first terminal memory 410.

Thereafter, the printing application executor 401 causes the reading unit 42 to read the information from the NFC tag 3 (step SG3).

Thereafter, the printing application executor 401 determines whether the information read in step SG3 includes the mail address or the IP address (step SG4). The determination in step SG4 is performed based on whether the information includes a specific sign such as "@" or based on the form of a character string or the like.

When the printing application executor 401 determines that the information includes the IP address (IP address in step SG4), the printing application executor 401 executes corresponding processing (step SG5).

In step SG5, in a state in which the first terminal apparatus 4 is not connected to the local network LN, the printing application executor 401 issues a request to connect to the local network LN. In step SG5, in a state in which the first terminal apparatus 4 is connected to the local network LN, the printing application executor 401 transmits image data of the image selected in step SG1 to the printing apparatus 1 by using the IP address read in step SG3. In step SG5, the printing application executor 401 transmits storage request information to the provision server 7. The storage request information has, recorded therein, the installer ID read in step SG3, the image data of the image selected in step SG1, and the printing condition accepted in step SG2. Upon receiving the storage request information, the provision communication controller 701 of the provision server 7 stores, to the printing management DB 713, a record having the installer ID, the image data, and the printing condition included in the storage request information.

On the other hand, when the printing application executor 401 determines that the information includes the mail address (mail address in step SG4), the printing application executor 401 transmits print instruction information to the provision server 7 (step SG6). The print instruction information is information indicating a print instruction for the provision server 7. The print instruction information has, recorded therein, the mail address read in step SG3, the image data of the image selected in step SG1, and the printing condition accepted in step SG2.

As indicated by the flowchart FH, the provision communication controller 701 receives the print instruction information (step SH1).

Thereafter, the provision communication controller 701 stores, to the printing management DB 713, a record having the installer ID, the image data, and the printing condition included in the print instruction information received in step SH1 (step SH2).

Thereafter, the generator 702 generates print data based on the printing condition and the image data recorded in the print instruction information received in step SH1 (step SH3).

Thereafter, the provision communication controller 701 transmits the print data generated in step SH3 to the printing apparatus 1 based on, as a destination of the print data, the mail address recorded in the print instruction information received in step SH1 (step SH4).

As indicated by the flowchart FI, the printing communication controller 101 receives the print data from the provision server 7 (step SI1).

Thereafter, the printing controller 102 causes the printing unit 12 to perform printing based on the print data received in step SI1 (step SI2). It can be said that the printing unit 12 performs the printing using, as a trigger, the print instruction information transmitted by the printing application executor 401 to the provision server 7 and that the printing application executor 401 causes the printing unit 12 to perform the printing by transmitting the print instruction information to the provision server 7.

1-3-4. Operation for Provision Printing Cost

In the printing system 1000 according to the present embodiment, the printing cost is provided to the installer of the printing apparatus 1.

Next, an operation for providing the printing cost is described.

Figure 7:
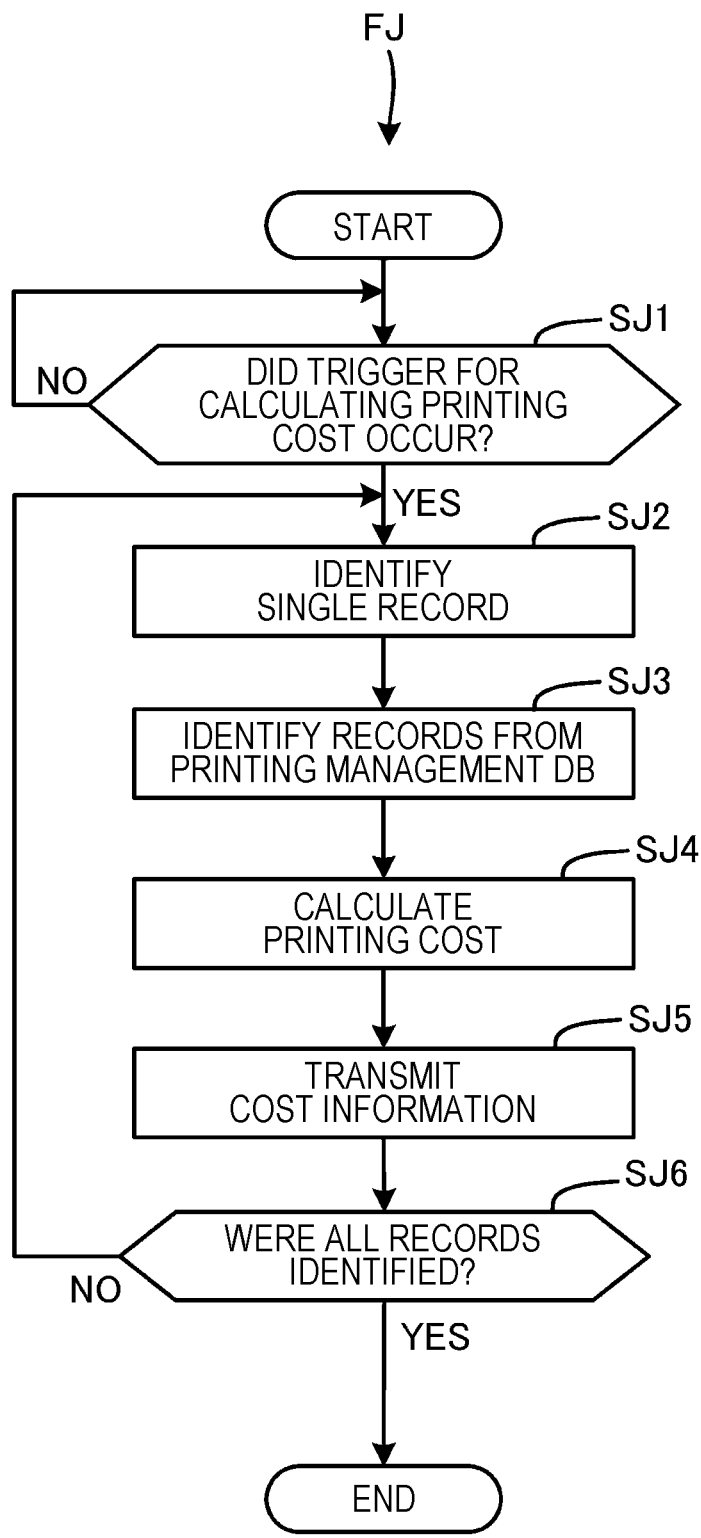
FIG. 7 is a flowchart illustrating an operation of the provision server.

FIG. 7 is a flowchart FJ illustrating an operation of the provision server 7.

The calculator 703 determines whether a trigger for calculating the printing cost occurred (step SJ1). Examples of the trigger are when the current date reaches a predetermined date and when the current time reaches a predetermined time.

The calculator 703 identifies a single record from the installer management DB 714 (step SJ2).

Thereafter, the calculator 703 identifies, from the printing management DB 713, all records in which the installer ID included in the record identified in step SJ2 is recorded (step SJ3).

Thereafter, the calculator 703 calculates the printing cost by analyzing image data and a printing condition recorded in each of the records identified in step SJ3 (step SJ4).

Step SJ4 is described below.

The calculator 703 analyzes the image data and the printing condition in each of the records, acquires elements such as the number of prints, the size of a print medium, and the amount of ink to be used, applies the acquired elements to a predetermined algorithm and a table in which elements are associated with costs, and calculates a cost for each of the records. Then, the calculator 703 calculates a sum of the costs calculated for all the records and treats the sum of the costs as the printing cost.

The provision communication controller 701 transmits cost information indicating the printing cost calculated in step SJ4 to the installer of the printing apparatus 1 based on installer communication information of the records identified in step SJ3 (step SJ5). By transmitting the cost information in step SJ5, the printing cost calculated in step SJ4 is provided to the installer.

Thereafter, the calculator 703 determines whether all records of the installer management DB 714 were identified in step SJ2 (step SJ6).

When the calculator 703 determines that not all the records of the installer management DB 714 were identified (NO in step SJ6), the calculator 703 returns the process to step SJ2, identifies an unidentified record in step SJ2, and executes the processing in steps SJ3 and the subsequent steps.

On the other hand, when the calculator 703 determines that all the records of the installer management DB 714 were identified (YES in step SJ6), the provision processor 700 ends this process.

1-3-5. Operation for Transfer

In the printing system 1000 according to the present embodiment, the printing cost is transferred to the account of the installer of the printing apparatus 1.

Next, an operation for the transfer is described.

Figure 8:
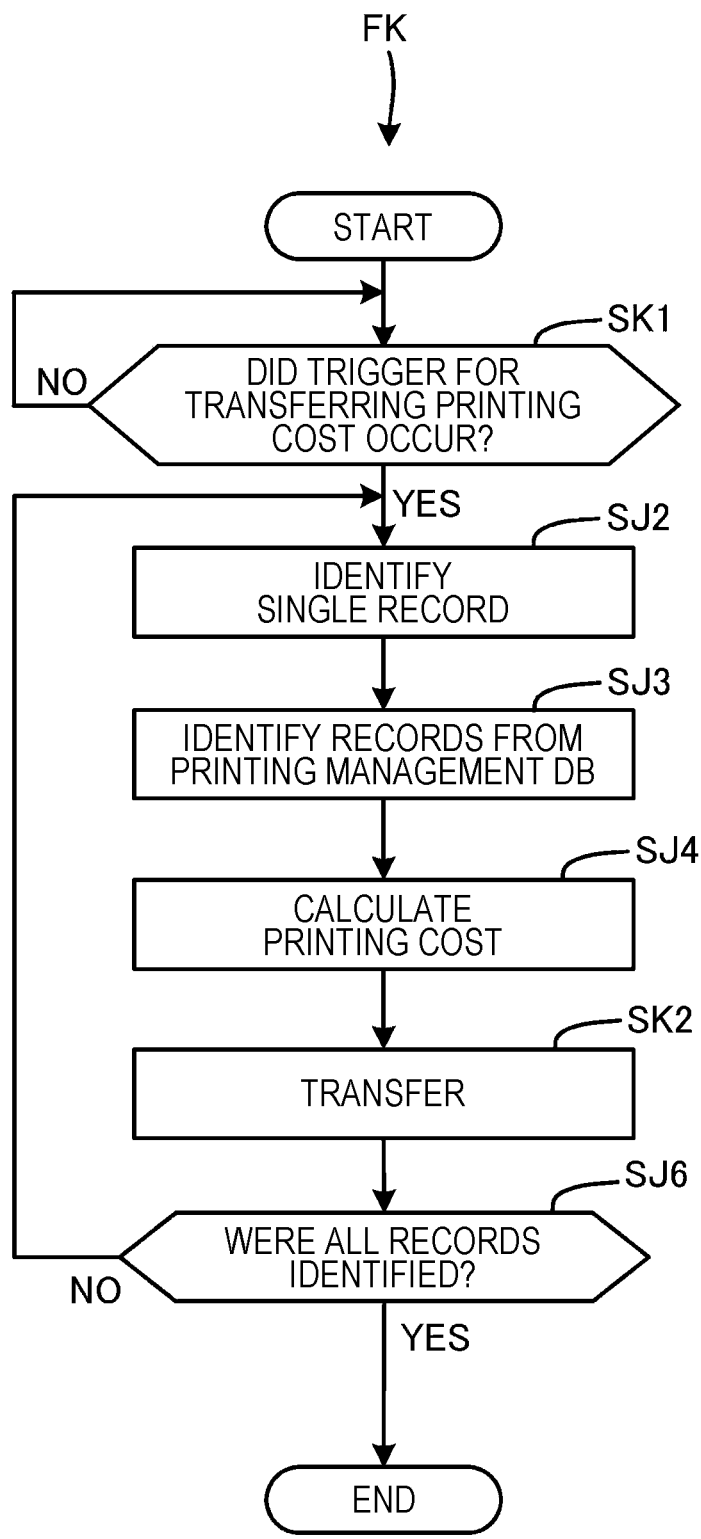
FIG. 8 is a flowchart illustrating an operation of the provision server.

FIG. 8 is a flowchart FK illustrating the operation of the provision server 7.

In the flowchart FK illustrated n FIG. 8, the same steps as those in the flowchart FJ illustrated in FIG. 7 are denoted by the same step signs as those in the flowchart FJ, and will not be described in detail.

The transferer 704 determines whether a trigger for transferring the printing cost occurred (step SK1). An example of the trigger is when the current date reaches a predetermined date.

When the transferer 704 determines that the trigger occurred (YES in step SK1), the calculator 703 executes the processing in steps SJ2 to SJ4.

Thereafter, the transferer 704 transfers the printing cost calculated in step SJ4 to the account of the installer based on the installer account information in the records identified in step SJ3 (step SK2). The transferer 704 transfers the printing cost to the account of the installer from an account of an entity that manages the provision server 7. The billing amount indicated in the billing information managed by the provision server 7 is transferred to the account of the entity that manages the provision server 7 from an entity that manages the billing server 8.

Thereafter, the provision processor 700 executes the processing in step SJ6.

2. Second Embodiment

Next, a second embodiment is described.

Comparing the first embodiment with the second embodiment, an NFC tag 3 or information recorded in a code displayed on a printing apparatus 1 is an identification character string. The identification character string is a character string uniquely identifying the printing apparatus 1.

The identification character string is an example of "second specific information" in the present disclosure. Comparing the first embodiment with the second embodiment, a printing system 1000 according to the second embodiment further includes a transformation server 9. The transformation server 9 is an apparatus that transforms the identification character string into a mail address. The mail address is assigned to the printing apparatus 1. The transformation server 9 is connected to a wide area network WN and communicates with a first terminal apparatus 4.

In the second embodiment, the mail address is an example of the "first specific information" in the present disclosure.

In the present embodiment, a transfer server 6, a provision server 7, and the transformation server 9 form a first server 14. The first server 14 is a server collectively representing the transfer server 6, the provision server 7, and the transformation server 9.

2-1. Configuration of Transformation Server

A configuration of the transformation server 9 is described below.

Figure 9:
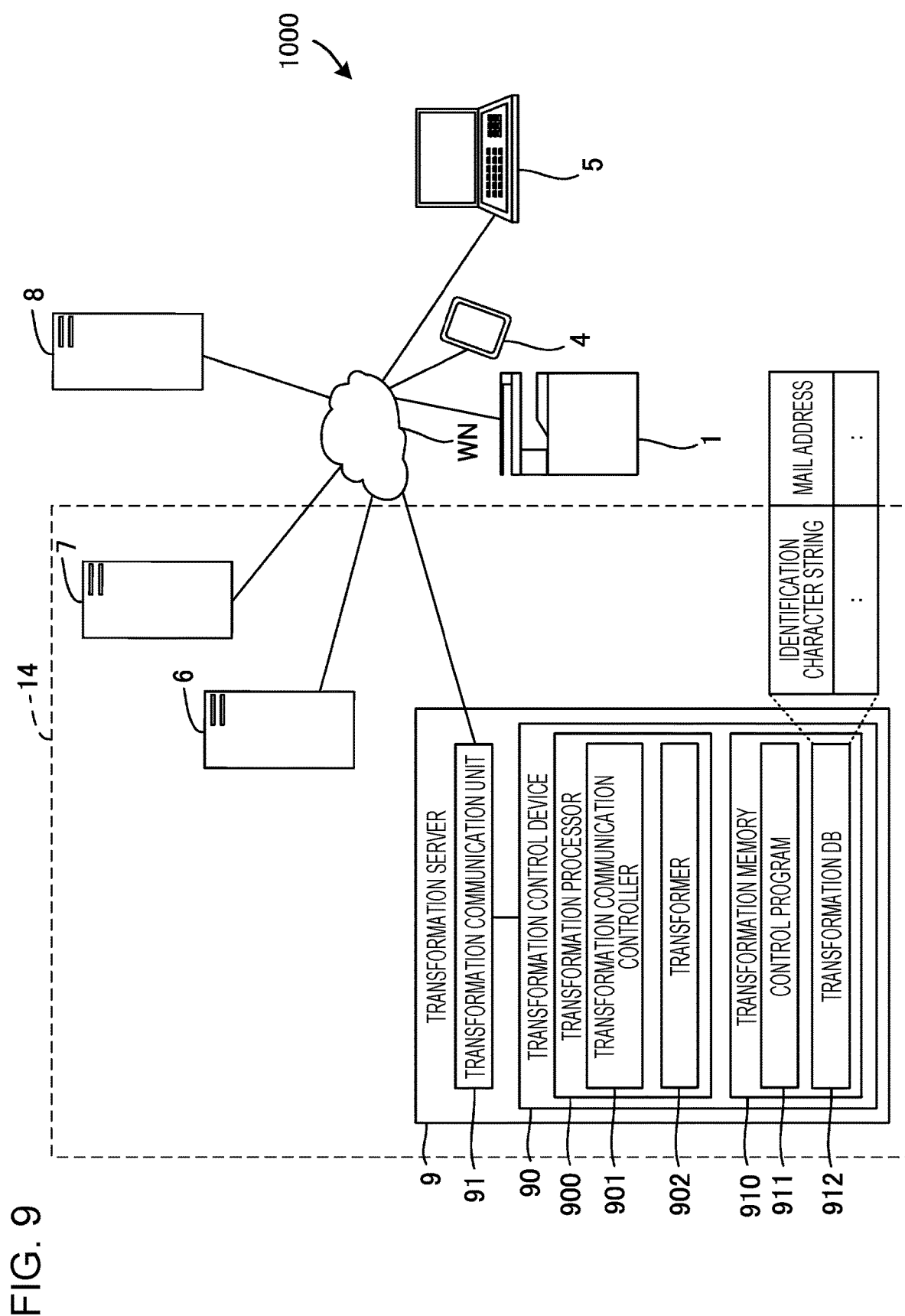
FIG. 9 is a diagram illustrating a configuration of a transformation server.

FIG. 9 is a diagram illustrating the configuration of the transformation server 9.

The transformation server 9 includes a transformation control device 90 and a transformation communication unit 91.

The transformation control device 90 is a control device that controls each unit of the transformation server 9. The transformation control device 90 includes a transformation processor 900 that is a processor such as a CPU, a transformation memory 910, and an interface circuit for connecting the transformation server 9 to the other apparatuses and sensors, and controls each unit of the transformation server 9.

The transformation memory 910 is a memory storing a program and data. The transformation memory 910 stores a control program 911, a transformation database (DB) 912, and data to be processed by the transformation processor 900. The transformation memory 910 includes a nonvolatile storage region. The transformation memory 910 may include a volatile storage region and form a work area of the transformation processor 900. The transformation memory 910 includes, for example, a ROM and a RAM.

The transformation DB 912 is a database for transformation of the identification characteristic string into the mail address. The identification character string and the mail address are recorded in a single record stored in the transformation DB 912. The mail address recorded in the record of the transformation DB 912 is assigned to the printing apparatus 1.

The transformation communication unit 91 includes communication hardware such as a communication circuit and communicates with the first terminal apparatus 4 in accordance with control by the transformation control device 90.

The transformation processor 900 functions as a transformation communication controller 901 and a transformer 902 by reading and executing the control program 911.

The transformation communication controller 901 communicates with the first terminal apparatus 4 via the transformation communication unit 91.

The transformer 902 references the transformation DB 912 and transforms the identification character string into the mail address. The transformer 902 performs the transformation in a state in which a user P logs into a service for using the printing apparatus 1. When information received by the transformation communication controller 901 is transformation request information transmitted by a function of a printing application 411, the transformer 902 transforms the identification character string into the mail address. The transformation request information is information requesting to transform the identification character string into the mail address. The transformation request information includes not only information indicating the identification character string but also information indicating that the user P is logging into the service for using the printing apparatus 1. On the other hand, when information received by the transformation communication controller 901 is information other than the transformation request information, the transformer 902 does not perform the transformation.

2-2. Operation of Printing System

Comparing the first embodiment with the second embodiment, the second embodiment is different from the first embodiment in that the first terminal apparatus 4 is used to cause the printing apparatus 1 to perform printing in the second embodiment. Other operations in the second embodiment are the same as those in the first embodiment.

Figure 10:
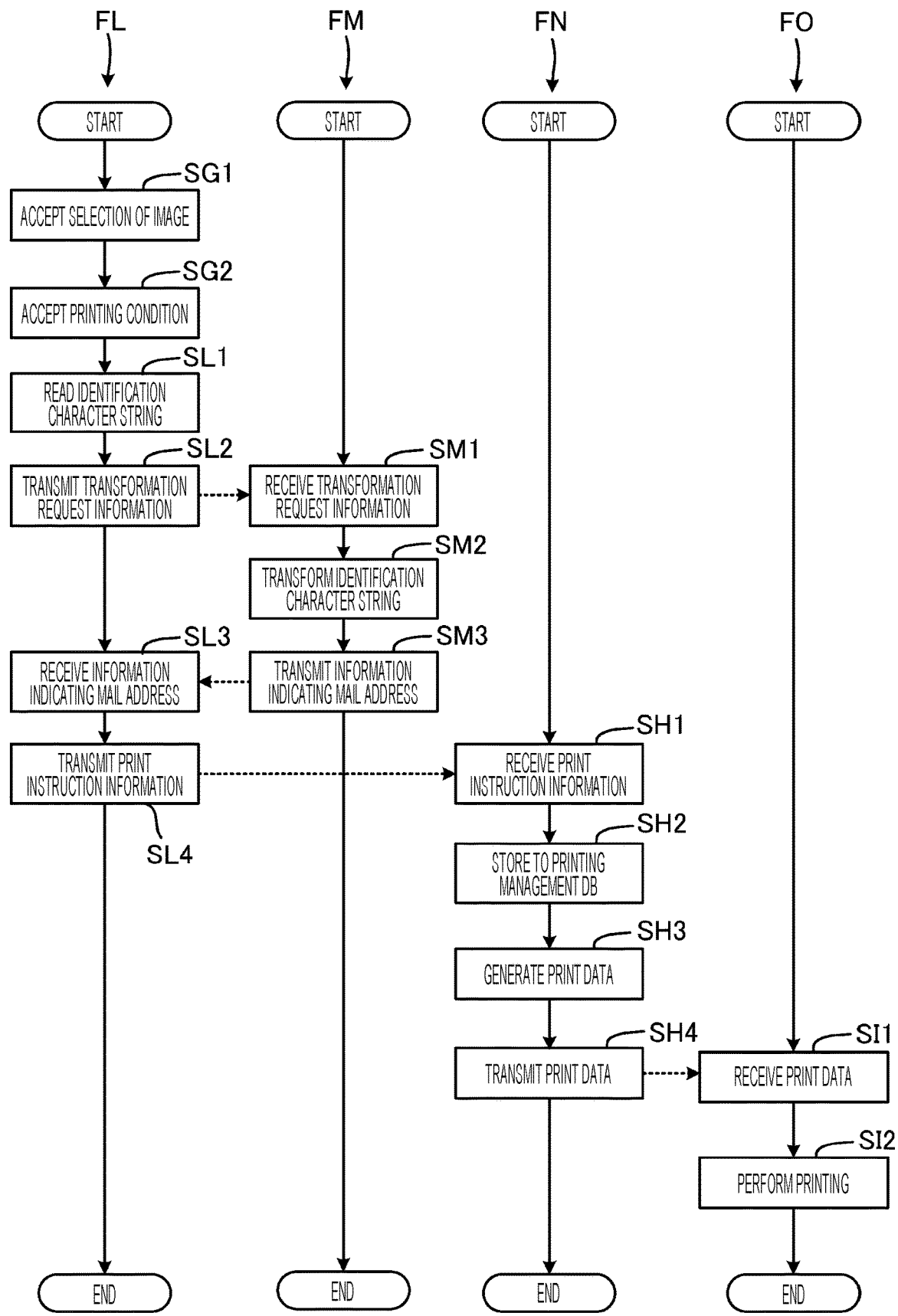
FIG. 10 is a flowchart illustrating an operation of a printing system according to a second embodiment.

FIG. 10 is a flowchart illustrating an operation of the printing system 1000 according to the second embodiment.

In FIG. 10, a flowchart FL represents an operation of the first terminal apparatus 4, a flowchart FM represents an operation of the transformation server 9, a flowchart FN represents an operation of the provision server 7, and a flowchart FO represents an operation of the printing apparatus 1.

In the flowcharts illustrated in FIG. 10, the same steps as those in the flowcharts illustrated in FIG. 6 are denoted by the same step signs as those in the flowcharts illustrated in FIG. 6 and will not be described in detail.

As indicated by the flowchart FL, a printing application executor 401 causes a reading unit 42 to read the identification character string from the NFC tag 3 (step SL1).

Thereafter, the printing application executor 401 transmits transformation request information to the transformation server 9 (step SL2). The transformation request information transmitted in step SL2 has, recorded therein, the identification character string read in step SL1.

As indicated by the flowchart FM, the transformation communication controller 901 receives the transformation request information (step SM1).

Thereafter, the transformer 902 transforms the identification character string included in the transformation request information received in step SM1 into a mail address (step SM2). In step SM2, the transformer 902 identifies, from the transformation DB 912, a record having the identification character string included in the transformation request information received in step SM1. Then, the transformer 902 transforms the identification character string included in the transformation request information into the mail address recorded in the identified record.

Thereafter, the transformation communication controller 901 transmits, to the first terminal apparatus 4, information indicating the mail address transformed in step SM2 in response to the transformation request information (step SM3).

As indicated by the flowchart FL, the printing application executor 401 receives the information indicating the mail address from the transformation server 9 (step SL3).

Thereafter, the printing application executor 401 transmits print instruction information to the provision server 7 (step SL4). The print instruction information transmitted in step SL4 has, recorded therein, the mail address indicated in the information received in step SL3, a printing condition accepted in step SG2, and image data of an image selected in step SG1.

3. Third Embodiment

Next, a third embodiment is described.

3-1. Configuration of Printing System

Figure 11:
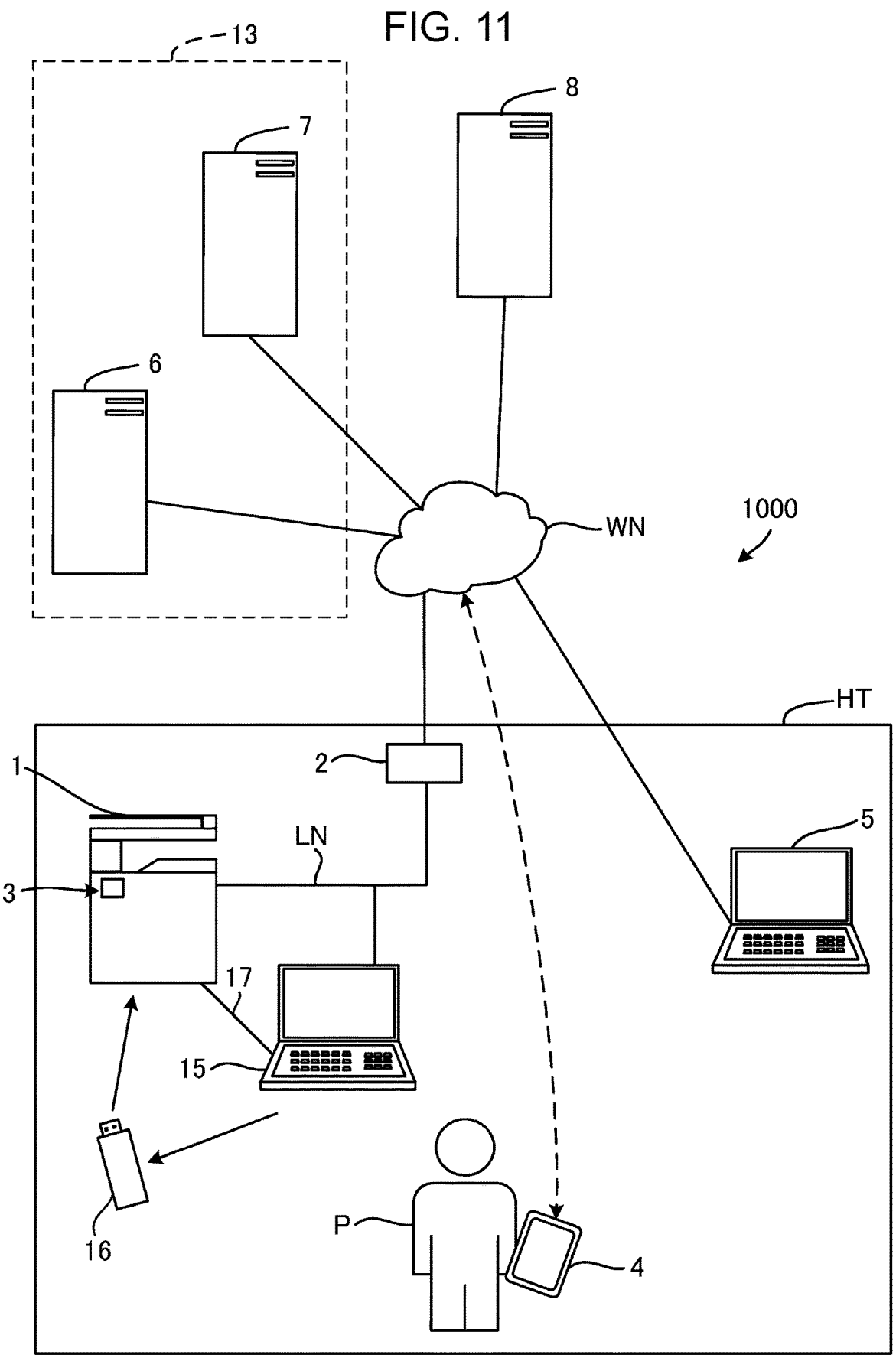
FIG. 11 is a diagram illustrating a configuration of a printing system according to a third embodiment.

FIG. 11 is a diagram illustrating a configuration of a printing system 1000 according to the third embodiment.

Comparing the third embodiment with the first and second embodiments, the printing system 1000 according to the third embodiment further includes a third terminal apparatus 15. The printing system 1000 illustrated in FIG. 11 includes the third terminal apparatus 15 in the configuration described in the first embodiment, but may include the third terminal apparatus 15 in the configuration described in the second embodiment.

The third terminal apparatus 15 according to the third embodiment is, for example, a PC that is used by an employee of the hotel HT. In the present embodiment, a case where the third terminal apparatus 15 is a laptop PC is exemplified. The third terminal apparatus 15 is connected to a network other than a local network LN. The third terminal apparatus 15 relays communication between a provision server 7 and a printing apparatus 1. In the third terminal apparatus 15, a printer driver is installed. The printer driver has a function of generating print data conforming to a command system of the printing apparatus 1 connected to the third terminal apparatus 15. The third terminal apparatus 15 periodically transmits, to the provision server 7, information regarding the printing apparatus 1 connected to the local network LN. Examples of the information regarding the printing apparatus 1 are information indicating a manufacturer of the printing apparatus 1 and information indicating the type of the printing apparatus 1. Therefore, the provision server 7 can manage the information regarding the printing apparatus 1.

Comparing the third embodiment with the first and second embodiments, a printing apparatus ID is used instead of a mail address in the third embodiment. The printing apparatus ID is information uniquely identifying the printing apparatus 1 and is information other than a mail address.

In the present embodiment, the printing apparatus ID is an example of the "first specific information" in the present disclosure.

3-2. Operation of Printing System

Next, an operation of the printing system 1000 according to the third embodiment is described.

Comparing the third embodiment with the first and second embodiments, the third embodiment is different from the first and second embodiments in that an operation for a case where a first terminal apparatus 4 is used to cause the printing apparatus 1 to perform printing is different from those in the first and second embodiments. Other operations in the third embodiment are the same as those described in the first and second embodiments.

A provision communication controller 701 according to the third embodiment transmits, to the third terminal apparatus 15, image data included in print instruction information received from the first terminal apparatus 4. Therefore, the provision server 7 according to the third embodiment does not generate print data. The provision server 7 according to the present embodiment manages correspondence between the printing apparatus ID and communication information for communication with the third terminal apparatus 15. Therefore, the provision communication controller 701 can acquire the communication information based on the printing apparatus ID included in the print instruction information received from the first terminal apparatus 4 and can appropriately transmit the image data to the third terminal apparatus 15.

Upon receiving the image data, the third terminal apparatus 15 generates print data based on the received image data by using the function of the printer driver. Thereafter, the third terminal apparatus 15 transmits the generated print data to the printing apparatus 1. The printing apparatus 1 performs printing based on the print data received from the third terminal apparatus 15. The third terminal apparatus 15 may transmit the print data to the printing apparatus 1 in such a way that the print data does not pass through the third communication path. In this case, for example, the third terminal apparatus 15 transmits the print data to the printing apparatus 1 by storing, to a USB memory 16, the print data generated based on the received image data and attaching the USB memory 16 to the printing apparatus 1 or by connecting the third terminal apparatus 15 to the printing apparatus 1 via a cable such as a USB cable 17. A communication path in which the print data is transmitted via the USB memory 16 or through the USB cable 17 is referred to as a fourth communication path.

4. Other Embodiments

Each of the embodiments described above represents an aspect and can be arbitrarily modified and applied.

In each of the embodiments described above, the case where the printing system 1000 is applied in the hotel HT is exemplified, but a location where the printing system 1000 is applied is not limited to the hotel HT, and the printing system 1000 may be installed in another place such as a cram school, a school, a station, a supermarket, or a department store.

In each of the embodiments described above, the communication path in which the mobile data communication is used is exemplified as the second communication path, but the second communication path may be a communication path in which a network other than a network connected to the printing apparatus 1 is used.

In each of the embodiments described above, the address read from the NFC tag 3 or from the code is the mail address or the IP address. In another embodiment, the address read from the NFC tag 3 or from the code may be only the mail address.

In each of the embodiments described above, the NFC tag 3 is attached to the printing apparatus 1, but the printing apparatus 1 may include an NFC module and the above-described information may be recorded in the NFC module.

In the first embodiment, the case where the first server 13 includes the two apparatuses is exemplified. However, the first server 13 may not be limited to a server including two apparatuses. The first server 13 may include a plurality of apparatuses that perform different processes. Alternatively, the first server 13 may include only a single apparatus that executes each of the functions of the first server 13.

In the second embodiment, the case where the first server 14 is divided into the three apparatuses is exemplified. However, the first server 14 may not be limited to a server including three apparatuses. The first server 14 may include a plurality of server apparatuses that perform different processes. Alternatively, the first server 14 may include only a single apparatus that executes each of the functions of the first server 14.

The functions of the printing processor 100, the first terminal processor 400, the second terminal processor 500, the transfer processor 600, the provision processor 700, the billing processor 800, and the transformation processor 900 may be implemented by a plurality of processors or a semiconductor chip.

The units illustrated in FIGS. 2A to 2C, FIGS. 3A and 3B, and FIG. 9 are an example and are not particularly limited. Hardware individually corresponding to each of the units may not be necessarily implemented, and a single processor may implement the functions of the units by executing a program. One or more of the functions implemented by the software may be hardware, or one or more of the functions implemented by the hardware may be implemented by software. In addition, specific detailed configurations of the other units in the printing apparatus 1, the first terminal apparatus 4, the second terminal apparatus 5, the transfer server 6, the provision server 7, the billing server 8, and the transformation server 9 can be arbitrarily changed.

The operations illustrated in FIGS. 4 to 8 and 10 are divided into the steps according to the main processing contents in order to facilitate understanding of the operations of the units of the printing system 1000, and the division of the operations is not limited by the method of dividing the operations in units of the processing and by the names. Each of the operations may be divided into a larger number of steps according to the processing contents. Each of the operations may be divided into steps in such a way that each of the steps includes a larger number of processes. In addition, the order in which the steps are performed may be changed as appropriate.

The first terminal apparatus transmits the mail address, the image data, and the printing condition as the print instruction information to the first server. However, the first terminal apparatus may transmit the mail address to the first server and may not transmit the image data and the printing condition. In this case, the first server acquires the image data and the printing condition from the first terminal apparatus or another terminal apparatus at a time different from the time when the first server receives the print instruction information. The first terminal apparatus causes the printing apparatus corresponding to the mail address included in the print instruction information to perform printing based on the image data and the printing condition corresponding to the print instruction information. The correspondence between the print instruction information, and the image data and the printing condition may be obtained by transmitting ID information of an ID identifying the first terminal apparatus and the ID identifying the user or other information together with the print instruction information from the first terminal apparatus to the first server.

The printing system 1000 may print electronic data other than image data.

5. Summary of Present Disclosure

A summary of the present disclosure is additionally described below.

Supplementary Note 1

A printing system includes a first terminal apparatus, a printing apparatus, and a first server. The first terminal apparatus acquires first specific information of the printing apparatus through a first communication path in which the first terminal apparatus performs near field communication with the printing apparatus, or from a code displayed on the printing apparatus, and transmits electronic data and the acquired first specific information to the first server through a second communication path. The first server transmits the received electronic data to the printing apparatus through a third communication path based on the received first specific information.

According to this configuration, when a user is present near the printing apparatus, the user can cause the printing apparatus to perform printing, and even when a terminal apparatus and the printing apparatus do not participate in the same network, the terminal apparatus can be used to cause the printing apparatus to perform printing. Therefore, it is possible to improve security for a printed material and perform printing by the printing apparatus without effort by the user.

Supplementary Note 2

The printing system described in Supplementary Note 1 further includes a second terminal apparatus. In the printing system described in Supplementary Note 1, the second terminal apparatus transmits the electronic data to the first server, and the first terminal apparatus receives the electronic data from the first server.

According to this configuration, an image stored in the second terminal apparatus can be transferred to the first terminal apparatus. Therefore, an image stored in a terminal apparatus different from the terminal apparatus that is used to cause the printing apparatus to perform printing can be printed by the printing apparatus. As a result, it is possible to improve convenience for the user.

Supplementary Note 3

In the printing system described in Supplementary Note 1 or 2, when the first specific information is a mail address assigned to the printing apparatus, the first terminal apparatus transmits the first specific information and the electronic data to the first server through the second communication path, and when the first specific information is an address in the third communication path, the first terminal apparatus transmits the electronic data to the printing apparatus through the third communication path.

According to this configuration, it is possible to switch, based on the type of the first specific information, between the communication paths through which the electronic data is transmitted. Therefore, it is possible to reduce the occurrence of a situation in which the electronic data cannot be transmitted to the printing apparatus depending on the type of the first specific information.

Supplementary Note 4

In the printing system described in any one of Supplementary Notes 1 to 3, the first terminal apparatus acquires, from the printing apparatus through the first communication path or from the code, second specific information for acquiring the first specific information, and transmits the acquired second specific information to the first server, and in a state in which a user of the first terminal apparatus logs into a service for using the printing apparatus, the first server transforms the received second specific information into the first specific information, and transmits the transformed first specific information to the first terminal apparatus, and the first terminal apparatus acquires the first specific information by receiving the first specific information from the first server.

According to this configuration, in a state in which a user of the terminal apparatus logs into the service for using the printing apparatus, the second specific information is transformed into the first specific information and thus a user who can perform printing using the printing apparatus can be limited. Therefore, it is possible to suppress unauthorized use of the printing apparatus.

Supplementary Note 5

The printing system described in any one of Supplementary Notes 1 to 4 further includes a third terminal apparatus. In the printing system described in any one of Supplementary Notes 1 to 4, the first server transmits the electronic data to the third terminal apparatus through the third communication path, and the third terminal apparatus generates, based on the electronic data received from the first server, print data including the electronic data and a control command conforming to a command system of the printing apparatus, and transmits the generated print data to the printing apparatus through the third communication path or a fourth communication path.

According to this configuration, the third terminal apparatus receives the electronic data from the first server, generates the print data, and transmits the print data to the printing apparatus. Therefore, even when the first server does not have a function of generating print data corresponding to the printing apparatus, it is possible to build a system in which the printing apparatus can perform printing near the user.

Supplementary Note 6

In the printing system described in Supplementary Note 5, the third terminal apparatus transmits information regarding the printing apparatus to the first server.

According to this configuration, the first server can manage information regarding the printing apparatus. Therefore, even when the first server does not have a function of generating print data corresponding to the printing apparatus, the first server can execute processing using the information regarding the printing apparatus.

Supplementary Note 7

The printing system described in any one of Supplementary Notes 1 to 6 further includes a second server that provides print right information of a right to perform printing on a single sheet using the printing apparatus. In the printing system described in any one of Supplementary Notes 1 to 6, the first terminal apparatus transmits, to the second server, billing information indicating a billing amount charged for using the printing apparatus by a user of the first terminal apparatus, the second server transmits, to the first terminal apparatus, the print right information for the number of sheets corresponding to the billing amount indicated in the billing information received from the first terminal apparatus, and the first terminal apparatus transmits the electronic data and the first specific information to the first server by using the print right information received from the second server.

According to this configuration, it is possible to build a system in which security for a printed material can be improved and printing can be performed by the printing apparatus without effort by the user and a system that can perform printing by billing.

Supplementary Note 8

In the printing system described in Supplementary Note 7, the first server manages the billing information transmitted by the first terminal apparatus to the second server.

According to this configuration, the server different from the server that provides the print right information manages the billing information. Therefore, the server different from the server that provides the print right information can use the billing information.

Supplementary Note 9

In the printing system described in any one of Supplementary Notes 1 to 8, the first server manages printing information regarding printing by the printing apparatus, calculates a printing cost of the printing by the printing apparatus based on the printing information being managed, and provides the calculated printing cost to an installer of the printing apparatus.

According to this configuration, since the printing cost is provided to the installer of the printing apparatus, the installer of the printing apparatus can use the printing cost. Therefore, it is possible to improve convenience for the installer of the printing apparatus.

Supplementary Note 10

In the printing system described in any one of Supplementary Notes 1 to 9, the first server manages printing information regarding printing by the printing apparatus and transfers, based on the managed printing information, a printing cost of the printing by the printing apparatus to an account of an installer of the printing apparatus.

According to this configuration, since the printing cost is automatically transferred to the account of the installer of the printing apparatus, it is not necessary for the installer of the printing apparatus to collect the printing cost. Therefore, it is possible to improve convenience for the installer of the printing apparatus.

Supplementary Note 11

A method for controlling a printing system includes causing a first terminal apparatus to acquire first specific information of a printing apparatus through a first communication path in which the first terminal apparatus performs near field communication with the printing apparatus, or from a code displayed on the printing apparatus, and transmit electronic data and the acquired first specific information to a first server through a second communication path, and causing the first server to transmit the received electronic data to the printing apparatus through a third communication path based on the received first specific information.

According to this configuration, the same effects as those obtained by the printing system described in Supplementary Note 1 are obtained.

What is claimed is:

1. A printing system comprising a first terminal apparatus, a printing apparatus, and a first server, wherein
    the first terminal apparatus acquires second specific information of the printing apparatus by near field communication with the printing apparatus or from a code displayed on the printing apparatus and transmits the acquired second specific information to the first server via mobile data communication,
    in a state in which a user of the first terminal apparatus logs into a service for using the printing apparatus, the first server transforms the received second specific information into first specific information and transmits the first specific information to the first terminal apparatus,
    the first terminal apparatus acquires the first specific information from the first server,
    the first terminal apparatus transmits the acquired first specific information to the first server via mobile data communication,
    the first server transmits electronic data corresponding to the printing apparatus to the printing apparatus through a local network based on the first specific information received from the first terminal apparatus, and
    the printing apparatus prints the electronic data received from the first server.

2. The printing system according to claim 1, further comprising a second terminal apparatus, wherein
    the second terminal apparatus transmits the electronic data to the first server, and
    the first terminal apparatus receives the electronic data from the first server.

3. The printing system according to claim 1, wherein
    when the first specific information is a mail address assigned to the printing apparatus, the first terminal apparatus transmits the first specific information and the electronic data to the first server via the mobile data communication, and
    when the first specific information is an address in the local network, the first terminal apparatus transmits the electronic data to the printing apparatus through the local network.

4. The printing system according to claim 1, further comprising a third terminal apparatus, wherein
    the first server transmits the electronic data to the third terminal apparatus through the local network,
    the third terminal apparatus generates, based on the electronic data received from the first server, print data including the electronic data and a control command conforming to a command system of the printing apparatus, and transmits the generated print data to the printing apparatus through the local network or via USB.

5. The printing system according to claim 4, wherein the third terminal apparatus transmits information regarding the printing apparatus to the first server.

6. The printing system according to claim 1, further comprising a second server that provides print right information of a right to perform printing on a single sheet using the printing apparatus, wherein
    the first terminal apparatus transmits, to the second server, billing information indicating a billing amount charged for using the printing apparatus by the user of the first terminal apparatus,
    the second server transmits, to the first terminal apparatus, the print right information for a number of sheets corresponding to the billing amount indicated in the billing information received from the first terminal apparatus, and
    the first terminal apparatus transmits the electronic data and the first specific information to the first server by using the print right information received from the second server.

7. The printing system according to claim 6, wherein
    the first server manages the billing information transmitted by the first terminal apparatus to the second server.

8. The printing system according to claim 1, wherein
the first server manages printing information regarding the printing by the printing apparatus, calculates a printing cost of the printing by the printing apparatus based on the printing information being managed, and provides the calculated printing cost to an installer of the printing apparatus.

9. The printing system according to claim 1, wherein
the first server manages printing information regarding the printing by the printing apparatus and transfers, based on the managed printing information, a printing cost of the printing by the printing apparatus to an account of an installer of the printing apparatus.

10. A method for producing a printed material, the method comprising:
causing a first terminal apparatus to acquire second specific information of a printing apparatus from the printing apparatus in such a way that the second specific information does not pass through a first server;
causing the first terminal apparatus to transmit the acquired second specific information to the first server in such a way that the second specific information does not pass through the printing apparatus, wherein
in a state in which a user of the first terminal apparatus logs into a service for using the printing apparatus, the first server transforms the received second specific information into first specific information and transmits the first specific information to the first terminal apparatus;
causing the first terminal apparatus to acquire the first specific information from the first server;
causing the first terminal apparatus to transmit the acquired first specific information to the first server via mobile data communication in such a way that the first specific information does not pass through the printing apparatus;
causing the first server to transmit, based on the received first specific information, electronic data corresponding to the first terminal apparatus to the printing apparatus in such a way that the electronic data does not pass through the first terminal apparatus; and
causing the printing apparatus to produce a printed material by printing the received electronic data.

11. A non-transitory computer-readable storage medium storing a program, the program comprising causing a first terminal apparatus to operate to:
acquire second specific information of a printing apparatus from the printing apparatus in such a way that the second specific information does not pass through a first server;
transmit the acquired second specific information to the first server in such a way that the second specific information does not pass through the printing apparatus, wherein
in a state in which a user of the first terminal apparatus logs into a service for using the printing apparatus, the first server transforms the received second specific information into first specific information and transmits the first specific information to the first terminal apparatus;
acquire the first specific information from the first server;
transmit the acquired first specific information to the first server via mobile data communication in such a way that the first specific information does not pass through the printing apparatus; and
cause the printing apparatus corresponding to the first specific information to print electronic data corresponding to the first terminal apparatus via the first server.

\* \* \* \* \*